Aug. 22, 1967 J. P. STELMAK 3,337,678

SEALED MICROMINIATURE ELECTRONIC PACKAGE

Filed June 30, 1965

INVENTOR.
JOHN P. STELMAK
BY
Brown, Critchlow, Flick & Peckham.
ATTORNEYS.

United States Patent Office 3,337,678

Patented Aug. 22, 1967

3,337,678

SEALED MICROMINIATURE ELECTRONIC PACKAGE

John P. Stelmak, 325 Walnut St., Greensburg, Pa. 15601

Filed June 30, 1965, Ser. No. 468,387
3 Claims. (Cl. 174—52)

ABSTRACT OF THE DISCLOSURE

A glass frame is seated on a base plate and is joined to it. Metal leads embedded in the frame extend inwardly and outwardly therefrom. A metal frame is seated on the glass frame and is joined to it and has an upturned lip at the same edge as an upwardly projecting lip on the glass frame. An electronic device is surrounded by the frames and connected to the inner ends of the leads. A metal cover plate is joined to the top of the metal frame.

Tiny integrated microminiature electronic circuits of the thin-film and monolithic semiconductor types are hermetically sealed in very small, wafer-thin housings for protection against deleterious environments and as a means for connection into electronic systems. For example, an electronic device is placed in a miniature housing that is open at the top and has a side wall of glass, to the top of which a metal frame is joined, and then the device is connected to the inner ends of metal leads that extend through the glass. The housing then is closed by soldering or brazing a metal cover to the top of the metal frame. There are several objections to such a package. The metal frame quite often parts from the glass during the application of the heat required for soldering the cover into place. In some cases, the heat affects the electrical parameters of the electronic device. It is troublesome to align the cover and a solder preform with the underlying frame and to hold them in place during soldering. Furthermore, the solder distribution between the cover and frame is not always uniform, thereby increasing the possibility of air leaks.

It is among the objects of this invention to provide a microminiature electronic package, in which the stresses at the interface of the metal and glass frames are modified so that they are not all unidirectional, in which the area of that interface is increased for better sealing and strength, in which the interfaces between the solder and the frame and cover also are increased in area, in which the solder is satisfactorily located and contained, in which the cover is properly located and retained for soldering, in which the solder distribution between cover and frame is substantially uniform, in which the metal frame will not separate from the underlying glass, and in which the cover can be joined to the metal frame by methods other than soldering.

The invention is illustrated in the accompanying drawings, in which

Figure 1:
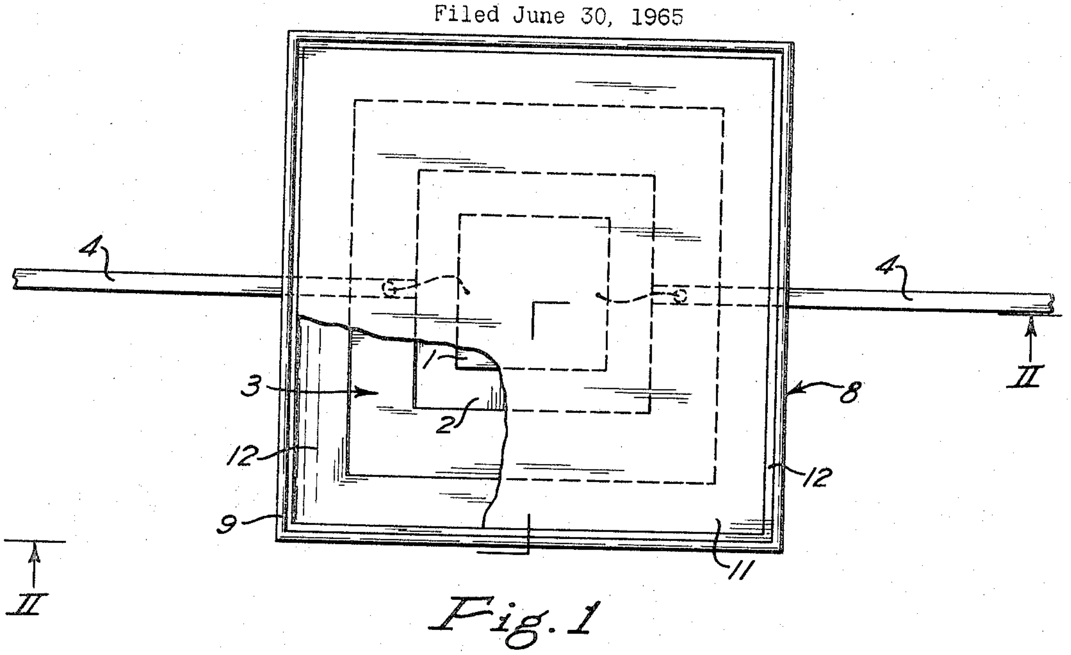
FIG. 1 is a greatly enlarged plan view of a sealed microminiature electronic package with parts broken away.
Figure 2:
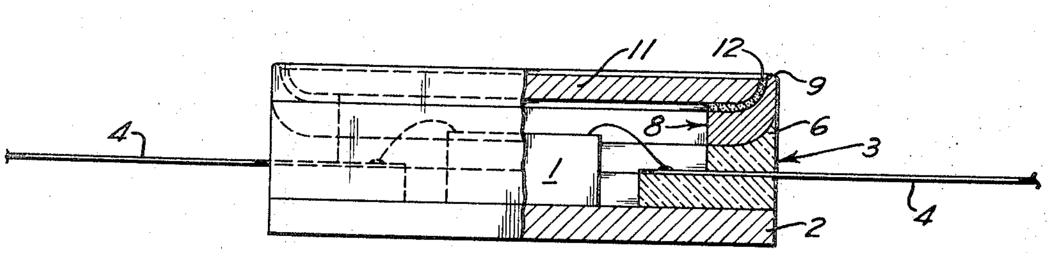
FIG. 2 is a side view and vertical section taken on the line II—II of FIG. 1.

Referring to FIGS. 1 and 2 of the drawings, an extremely small and thin package or housing for a tiny electronic device 1, such, for example, as a monolithic semiconductor, includes a base plate 2 that generally is metal, although it can be made of glass or ceramic material. Seated on the marginal area of the plate is a glass frame 3. Preferably, both elements are rectangular. The frame and plate are joined or bonded together by any suitable glass-to-metal sealing method. Metal leads 4 are embedded in opposite sides of the glass frame and extend inwardly and outwardly from it. There may be anywhere from two to several leads and they may be located at two or more sides of the frame, all depending upon the nature of the electronic device 1 and the circuit in which this unit is to be connected. One satisfactory way of sealing the leads in the glass frame is to make it in two superimposed parts that are fused together after the leads have been placed between them. If desired, the inside dimension of the lower part may be less than that of the upper part to form a support for the projecting inner ends of the leads.

It is a feature of this invention that the upper surface of the glass frame is not flat as heretofore, but is provided around its outer edge with an upwardly projecting lip 6, the outer side of which is flat and vertical and a continuation of the outer surface of the frame below it. The lip preferably is tapered upwardly in cross section and therefore, due to the extremely small size of this unit, the upper edge of this lip is relatively sharp. The inclined inner surface of the lip is curved into the flat upper surface area of the frame, so that the total upper surface area of the frame is greater than it would have been if the top of the frame had been flat and horizontal.

Seated on the glass frame is a thinner metal frame 8, the bottom of which is shaped to conform to the top of the glass frame and fit snugly against it. The two frames are bonded together by a conventional glass-to-metal seal. The metal frame also is surrounded by an upwardly projecting lip 9, which is formed by turning up the outer marginal portion of the frame and tapering it upwardly in cross section. The outer side of the rib is flat, but the inner side curves into the upper flat area of the metal frame. This provides the top of the metal frame with a recess having a flat bottom and a curved inclined outer side wall.

Instead of following the procedure just outlined, the base plate 2, both parts of the glass frame 3 with the metal leads between them, and metal frame 8 may be placed in a mold fixture and then heated to a temperature high enough to cause the glass to fuse to the leads, base and frame simultaneously.

The housing formed thus far has a base 2 and a side wall 3, 8. The electronic device 1 then is placed in the housing, where it may rest on the base plate. This device is electrically connected with the inner ends of leads 4 in the customary manner.

To hermetically seal the housing, a metal cover plate 11 is placed in the recess formed by the metal frame. The cover plate may be a very small piece of metal foil, typically .005″ thick. Before inserting the plate in the reces, a preform 12 of solder of the same shape as the recess is placed in it. Although the solder is only a film, perhaps .002″ thick, some stiffness is imparted to it for handling, due to its L-shape in cross section. The solder fits in the recess and is held in position by it. The solder, backed up by the metal frame, then holds the cover plate against shifting sideways on the frame while the plate is being bonded to the frame by the solder, these elements being subjected to the necessary heat for that operation. The dimensions of the unit or package thus formed may be, for example, .250″ x .250″ x .060″.

The soldering heat will not adversely affect this housing, as it did with similar housings heretofore, for a number of reasons. With a flat glass frame and a flat metal frame, the stresses caused by the soldering heat where the metal and glass frames joined were all unidirectional, with the result that part of the metal frame would often pull away from the glass. In my package, on the other hand, those same stresses are not all unidirectional because the metal-to-glass interface is not a flat plane. Also, due to the increased area of that interface, because of the inner side of the glass lip 6, the bonding area is greater than before. Another important factor is the lip 9 on the metal frame, which stiffens the frame and therefore makes it less likely to buckle and pull away from the glass.

As mentioned above, the recess in the top of the frame aligns the solder preform and the cover plate and holds them in correct position during soldering. Another advantage of this is that since the solder film is properly located and contained in the recess, the solder distribution between the cover plate and frame is uniform so that air leaks will not be formed. Also, since the solder extends up around the edge of the cover plate, greater areas of the plate and metal frame are soldered together than before and the solder around the edge of the plate adds to the seal.

Figure 3:
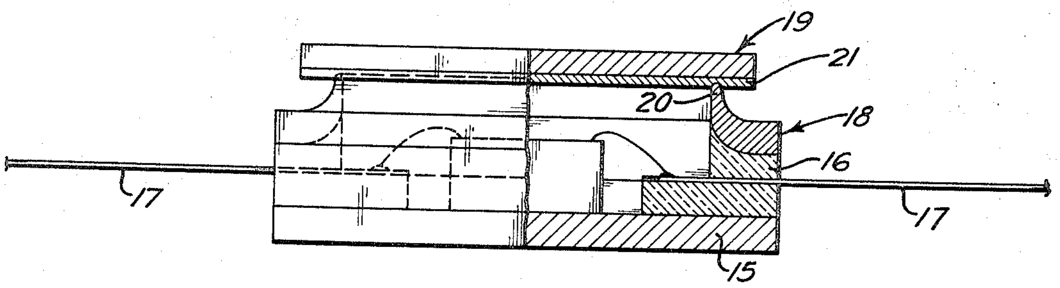
FIG. 3 is a view similar to FIG. 2 but shows a modification of the invention.

In some cases the relatively high temperature of the soldering operation, although not harming the housing, may affect the electrical parameters of the electronic device in the housing. This can be avoided by using a method of attaching the cover plate to the metal frame that does not involve soldering. A unit made in this modified way is illustrated in FIG. 3. The base plate 15, glass frame 16, embedded leads 17 and metal frame 18 are all made and bonded together in the same way as in the first embodiment of the invention, except that the lips on the two frames can be at the inside instead of the outside if desired. On the other hand, the solder preform is eliminated and the cover plate 19 is made large enough to overlie the upturned lip 20 of the metal frame.

To fasten the cover plate in place, it is placed on the metal lip and may be secured to it by thermocompression bonding, which involves the application of pressure to the plate directly above the lip and the simultaneous application of heat at temperatures far below the melting point of solders which are generally used. The sharp edge of the lip allows the buildup of sufficient unit pressure along the line of contact with the cover to weld them together without requiring prohibitively large forces or high temperatures. Or, instead of heat, the cover plate can be attached to the frame lip by ultrasonic bonding, in which a small force is applied normal to the top of the cover while ultrasonic vibrations are induced in the unit. In either case, best results are obtained if the bottom of the cover plate is softer than the lip engaging it so that the lip will be better able to sink into the cover. Thus, the cover may be made of copper, aluminum or gold, or of a layer 21 of one of these clad to the bottom of a plate made of harder metal, such as Kovar. It also is helpful in effectively joining of the cover to the lip of the metal frame to have first electroplated the surface of the frame with a thin layer (150 microns) of gold.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A sealed microminiatures electronic package comprising a base plate, a glass frame seated on the plate and joined thereto, metal leads embedded in the frame and extending inwardly and outwardly therefrom, the top of the frame having an upwardly projecting lip at one edge, a metal frame seated on the glass frame and conforming to its upper surface, the metal frame being joined to the glass frame and having an upturned lip at the same edge as the glass lip, an electronic device surrounded by said frames and electrically connected to the inner ends of said leads, and a metal cover plate mounted on said metal frame and joined thereto, the bottom of said cover plate being softer than the metal of said metal frame, and the upper edge of the metal frame lip being sharp and embedded in the bottom of the cover.

2. A sealed microminiature electronic package comprising a base plate, a glass frame seated on the plate and joined thereto, metal leads embedded in the frame and extending inwardly and outwardly therefrom, the top of the frame having an upwardly projecting lip at its outer edge, a metal frame seated on the glass frame and conforming to its upper surface, the metal frame being joined to the glass frame and having an upturned lip at its outer edge to provide the top of the metal frame with a recess, an electronic device surrounded by said frames and electrically connected to the inner ends of said leads, a metal cover plate disposed in said recess, and a film of solder between the cover plate and metal frame joining them together, said film conforming to the upper surface of the metal frame and surrounding the cover plate.

3. A sealed microminiature electronic package according to claim 2, in which the metal frame lip tapers upwardly in cross section.

References Cited

UNITED STATES PATENTS 3,190,952 6/1965 Bitko.

DARRELL L. CLAY, *Primary Examiner.*